United States Patent [19]

Riggs, Jr.

[11] Patent Number: 4,869,884
[45] Date of Patent: Sep. 26, 1989

[54] PROCESS FOR RECOVERING ACIDIC GASES

[75] Inventor: Olen L. Riggs, Jr., Oklahoma City, Okla.

[73] Assignee: Kerr-McGee Chemical Corporation, Oklahoma City, Okla.

[21] Appl. No.: 190,838

[22] Filed: May 6, 1988

[51] Int. Cl.$^4$ .............................................. B01D 55/14
[52] U.S. Cl. ......................................... 423/229; 55/68
[58] Field of Search .................. 55/68, 48, 46, 51; 423/228, 229

[56] References Cited

U.S. PATENT DOCUMENTS

| | | | |
|---|---|---|---|
| Re. 18,958 | 9/1933 | Bottoms | 23/2 |
| 3,829,521 | 8/1974 | Green | 423/228 X |
| 4,112,052 | 9/1978 | Sortori et al. | 423/228 |
| 4,437,419 | 10/1984 | Peorce et al. | 423/228 |
| 4,452,763 | 6/1984 | Von de Kraals et al. | 423/228 |
| 4,624,839 | 11/1986 | Wolcott et al. | 423/228 |
| 4,708,721 | 11/1987 | Ehrler | 55/68 X |
| 4,714,597 | 12/1987 | Trevino | 423/228 |

OTHER PUBLICATIONS

Kirk-Othmer *Encyclopedia of Chemical Technology*, 2ed, vol. 1 pp. 821-822.
Kirk-Othmer *Encyclopedia of Chemical Technology*, 2ed, vol. 4 357, 358, 362.

*Primary Examiner*—Charles Hart
*Attorney, Agent, or Firm*—William G. Addison; John P. Ward

[57] ABSTRACT

An improved process is provided for the removal and recovery of acidic gases contained in mixed gas streams. The improvements comprise cooling a process regenerated aqueous alkanolamine solution containing an alkanolamine concentration ranging up to about 20 percent by weight to a temperature ranging up to about 35° C. and introducing said cooled regenerated solution into an absorption zone to contact a mixed gas stream containing acidic gases and wherein the regenerated aqueous alkanolamine solution remains essentially at the temperature to which it is cooled throughout a substantial portion of the absorption zone.

4 Claims, 1 Drawing Sheet

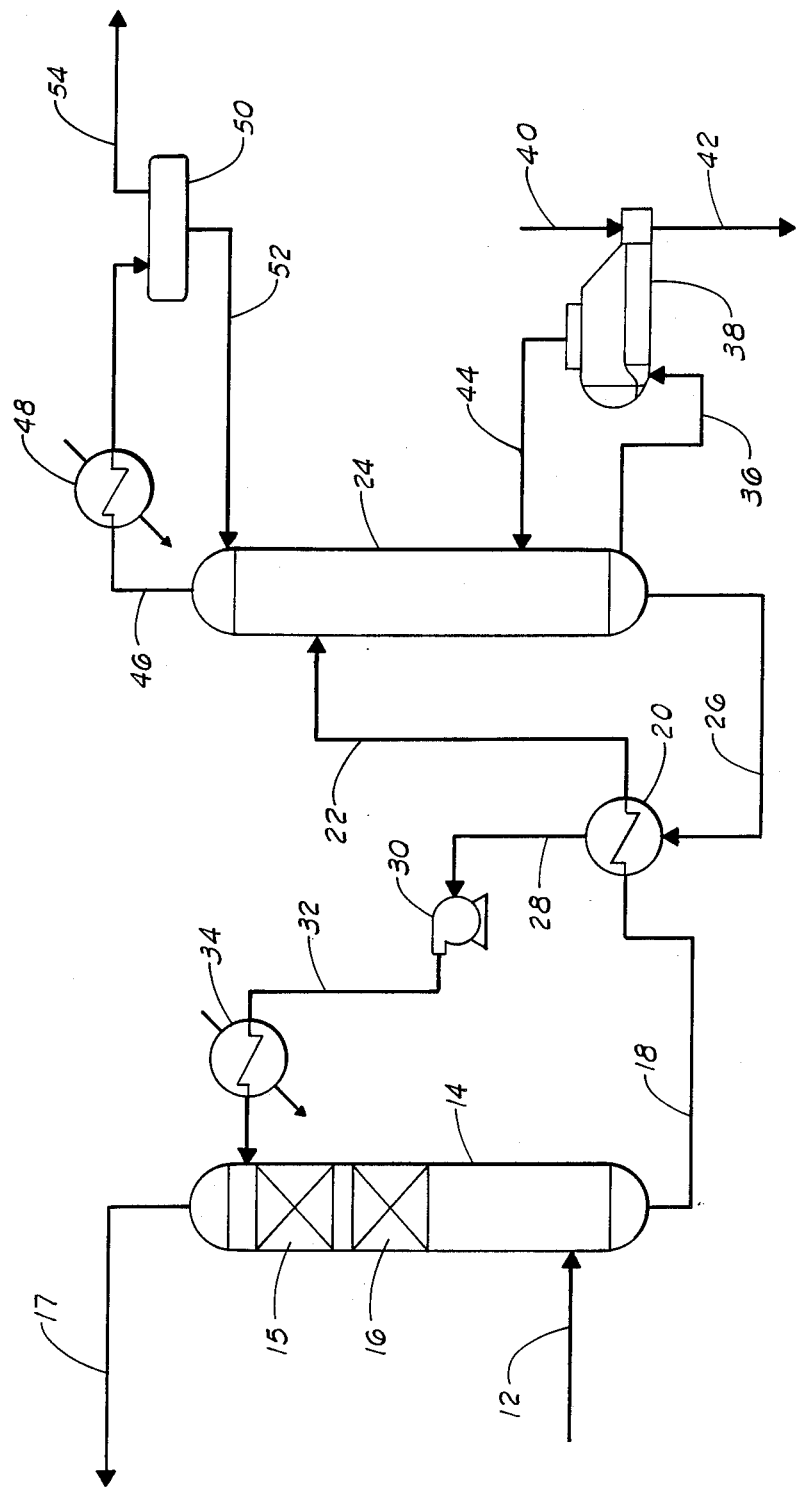

PROCESS FOR RECOVERING ACIDIC GASES

FIELD OF THE INVENTION

The present invention relates to improvements in a process for the removal and recovery of acidic gases contained in mixed gas streams. Particularly, it relates to improvements in a process for the treatment of carbon dioxide containing flue gases and the removal and recovery of the carbon dioxide therefrom.

BACKGROUND OF THE INVENTION

Many processes have been proposed for the removal of acidic gases such as, for example, carbon dioxide, sulfur dioxide, hydrogen sulfide and the like from mixed gas streams. One particularly successful and widely employed process for the removal of these acidic gases is the so-called "Girbotol Amine Process." This process has been employed to provide for both the removal and recovery of carbon dioxide from flue gases (see Kirk-Othmer, Encyclopedia of Chemical Technology, Vol. 4, 2ed (1969) page 362) as well as to sweeten natural gases (id., Vol. 1, pages 821–822). A more complete and detailed description of this process can be found in U.S. Pat. No. Re. 18,985, issued Sept. 26, 1933.

Broadly, the "Girbotol Amine Process" can be considered a two-step process where in the first step the mixed qas feed stream containinq the acidic gases is contacted with an alkanolamine or alkanolamine solution in a suitable absorption zone. This contact is effected over a range of operating conditions of temperature and pressure. The particular conditions employed for this contact will depend upon the nature of the mixed gas stream undergoing treatment, the alkanolamine employed, whether the purpose is the recovery of acidic gases contained in the mixed gas stream or merely to sweeten the mixed gas stream and the like. In this regard, operating conditions such as temperatures of from about 80° F. (26° C.) to about 150° F. (65° C.) and pressures of from atmospheric to about 1000 psi (70.3 kg/sq.cm.) have been employed in carrying out the first step of the process (see Kirk-Othmer, Encyclopedia of Chemical Technology. Vol. 1, 2Ed, (1969) page 822). Under these conditions the acidic gases combine with the alkanolamine to form acidic gas/alkanolamine products which are soluble in the alkanolamine and thereby are removed from the mixed gas stream undergoing treatment.

In the second step of the process, the acidic gas/alkanolamine products are withdrawn from the absorption zone and introduced into a suitable alkanolamine or alkanolamine solution regeneration zone. Within this regeneration zone, the acidic gas/alkanolamine products produced in the absorption zone are decomposed with the simultaneous regeneration of the individual acidic gases and the alkanolamine or alkanolamine solution. This regeneration step is carried out by heating the acidic gas/alkanolamine products to significantly higher temperatures than those employed in the first (or absorption) step of the process. The temperatures most usually employed in this second step will range from about 220° F. (104° C.) to 240° F. (115° C.). The regenerated alkanolamine or alkanolamine solution is returned to the absorption zone, after cooling, wherein it is employed to treat further quantities of the mixed gas stream. The acidic gases can be discarded or, in the case of carbon dioxide, recovered for further processing.

In general, faoilities utilizing the above described process are designed and constructed around predetermined operating conditions. Such conditions include the nature and make-up of the mixed gas feed stream to be treated, the alkanolamine to be employed and when employed in solution its concentration, the temperatures, pressures, and the like. Once these operating conditions are established the appropriate size equipment required for the facility readily can be determined. However, once constructed, the maximum capacity for such facilities is relatively fixed and cannot be increased without a major reconstruction of the facilities. Thus, any improvements in the above described process which can increase the removal of acidic gases in a gaseous stream without a major reconstruction of facilities based on such process would constitute a significant advancement in this art.

SUMMARY OF THE INVENTION

The present invention relates to improvements in a continuous process for removing and recovering an acidic gas from a mixed gas feed stream. Particularly, the present invention relates to improvements to a continuous process where in said process the acidic gas is removed by first contacting the mixed gas feed stream in an absorption zone with a regenerated aqueous alkanolamine solution. This contacting results in the formation of an acidic gas rich liquid effluent stream containing acid gas/alkanolamine reaction products. This acidic gas rich liquid effluent stream is recovered from the absorption zone and conveyed to and introduced into a regeneration zone. Within the regeneration zone the liquid effluent stream is heated to temperatures higher than those in the absorption zone whereby the acidic gas/alkanolamine reaction products formed in the absorption zone are decomposed to yield the acidic gas and regenerate the aqueous alkanolamine solution. The acidic gas is recovered from the regeneration zone as an overhead stream and the regenerated aqueous alkanolamine solution as a liquid effluent stream. This latter stream is recovered and recycled to the absorption zone for use in the treatment of further quantities of the acidic gas containing feed gas stream.

The improvements of the present invention relate to the absorption stage of the above process. The improvements themselves comprise introducing the regenerated aqueous alkanolamine solution, which will contain an alkanolamine concentration ranging up to about 20 weight percent, to the absorption zone and maintaining this regenerated aqueous alkanolamine solution at a temperature ranging up to about 35° C. throughout a substantial portion of the absorption zone. Use of the improvements of the present invention results in an increase in the rate of acidic gas removal and thus an increase in the actual amount of acidic gas removed and recovered.

BRIEF DESCRIPTION OF THE DRAWINGS

The single FIGURE represents is a schematic illustration of the general steps and flow of materials in the process to which the improvements of the present invention are applicable.

DETAILED DESCRIPTION OF THE INVENTION

It now has been found that the rate of absorption of an acidic gas or mixture of acidic gases in a gas stream containing the acidic gas or gases can be increased by the practice of the improvements of the present invention. Broadly, the improvements of the present invention comprise utilizing as an absorption agent, a process regenerated aqueous alkanolamine solution having an alkanolamine concentration ranging up to about 20 weight percent and preferably from about 15 to about 20 weight percent and cooling the regenerated alkanolamine solution to a temperature sufficient to maintain said solution at a temperature of up to about 35° C. throughout a substantial portion of the absorption zone.

The process and the improvements thereto constituting the present invention are more fully described by reference to the FIGURE. For purposes of illustration, the present invention is described below with respect to the treatment of a carbon dioxide-rich boiler flue gas received at a temperature ranging from about 135° C. to about 140° C. utilizing a process regenerated aqueous monoethanolamine solution as an absorption agent. This flue gas is fed through a conduit 12 into a lower section of an absorption zone 14. The flue gas is introduced into the lower section of the absorption zone 14 and flowed upwardly through the absorption zone 14 wherein it is contacted with a downwardly flowing stream of the regenerated aqueous monoethanolamine solution. The actual contact between the counterflowing flue gas and the regenerated aqueous monoethanolamine solution effectively occurs within a pair of absorption sections 15 and 16 located in an upper portion of the absorption zone 14. Generally, the absorption sections 15 and 16 will comprise various supported packing materials such as Raushing rings, Lessing rings, Berl saddles, Intalox saddles and the like or a series of trays such as bubble cap and sieve trays.

The regenerated aqueous monoethanolamine solution is introduced into the upper portion of the absorption zone 14 by way of conduit 32 and a distributor means (not shown) located immediately above absorption section 15. In accordance with the improvements of the present invention the regenerated aqueous monoethanolamine solution will be cooled to and introduced into the absorption zone 14 at a temperature that will remain essentially constant throughout a substantial portion of the absorption zone 14. In this regard, when the regenerated aqueous monoethanolamine solution to be introduced into absorption zone 14 via conduit 32 and the distributor means (not shown) is cooled to a temperature in the range of from about 80° F. (26° C.) to about 95° F. (35° C.) this solution will remain within this temperature range throughout a substantial portion of the absorption zone 14. By the phrase "substantial portion" is meant that the temperature of the regenerated aqueous monoethanolamine solution remains within the above temperature range throughout at least about 50 percent of the total volume occupied by the absorption section of the absorption zone. With reference to the FIGURE, this "substantial portion" would correspond to all of the absorption section 15 of the absorption zone 14. By maintaining the temperature of the regenerated aqueous monoethanolamine solution within the above described temperature range throughout all of absorption section 15 of the absorption zone 14 the rate of absorption of the carbon dioxide contained in the carbon dioxide-rich boiler flue gas by the regenerated aqueous monoethanolamine solution is increased. Specifically, it was found through experimentation that by maintaining the temperature of the regenerated aqueous monoethanolamine solution within the temperature range of from about 26° C. to about 35° C., the rate of absorption of the carbon dioxide by this solution can be increased by about 5 to about 10 percent over the rate of absorption attained when such a solution is utilized at temperatures greater than 35° C. As a result of achieving such increased absorption rates, the actual amount of carbon dioxide recovered is increased without the need for a major expansion of the equipment train employed to carry out the process.

As disclosed hereinabove, the absorption of the carbon dioxide by the regenerated aqueous monoethanolamine solution in absorption zone 14 leads to the formation of soluble carbon dioxide/monoethanolamine reaction products, resulting in the production of a carbon dioxide-lean gaseous overhead stream and a carbon dioxide-rich liquid effluent stream. The former is withdrawn from the absorption zone 14 via a conduit 17 and can be vented through the conduit 17 to the atmosphere. The carbon dioxide-rich liquid effluent stream is withdrawn from the absorption zone 14 by way of a conduit 18 and conveyed via the conduit 18, a heat exchange zone 20 and a conduit 22 to an upper portion of a regeneration zone 24.

Within the regeneration zone 24 the carbon dioxide-rich liquid effluent stream is subjected to decomposition and separation by heating this stream to temperatures in the range of from about 220° F. (104° C.) to about 240° F. (115° C.). The heat necessary to effect the decomposition can be provided by a reboil stream withdrawn from a reservoir of a carbon dioxide-lean aqueous monoethanolamine solution contained in a lower portion of the regeneration zone 24. The reboil stream is withdrawn from this reservoir via a conduit 36, passed through a reboiler 38 and returned to the regeneration zone 24 via a conduit 44. Heat is provided to the reboil stream using steam introduced into the reboiler 38 via a steam conduit 40 and recovered therefrom via a steam condensate conduit 42. The reboil stream is heated to a temperature within the range of from about 104° C. to about 115° C. and, when reintroduced back into the regeneration zone 24 via the conduit 44, provides the heat necessary to effect the decomposition of the carbon dioxide-rich liquid effluent stream.

As disclosed above, the carbon dioxide-rich effluent stream decomposes, within the regeneration zone 24, into a carbon dioxide-rich gaseous overhead stream and a carbon dioxide-lean liquid effluent stream. The carbon dioxide-rich gaseous overhead stream is withdrawn from the upper portion of the regeneration zone 24 by way of a conduit 46, passed through a cooler 48 to effect condensation of any monoethanolamine solution entrained therein and then introduced into a receiving zone 50. Any monoethanolamine contained in the carbon dioxide-rich gaseous overhead stream and condensed therefrom is collected in the receiving zone 50. This condensed monoethanolamine is returned from the receiving zone 50 to the upper portion of the regeneration zone 24 via a conduit 52. The noncondensed carbon dioxide contained in the carbon dioxide gaseous overhead stream is recovered from the receiving zone 50 by way of a conduit 54.

The regenerated aqueous monoethanolamine solution collects in the lower portion of the regeneration zone 24 and forms the reservoir of carbon dioxide-lean aqueous monoethanolamine solution disclosed hereinabove. This reservoir further provides the source of the regenerated aqueous monoethanolamine solution recycled to and utilized in the absorption zone 14. This regenerated aqueous monoethanolamine solution is withdrawn from the regeneration zone 24 via a conduit 26 and conveyed to the heat exchange zone 20 wherein it is passed in indirect heat exchange relationship with the carbon dioxide-rich liquid effluent stream flowing through the conduit 18. The resulting cooled monoethanolamine solution is withdrawn from the heat exchange zone 20 by way of a conduit 28, a pump 30 and a conduit 32 through which it is reintroduced into the upper section of the absorption zone 14.

Prior to reintroducing the cooled, regenerated aqueous monoethanolamine solution into the absorption zone 14 it further is cooled by means of a cooler 34 to a temperature in the range of from about 26° C. to about 35° C. Furthermore, the concentration of the monoethanolamine in the regenerated aqueous monoethanolamine solution is adjusted, as needed, to provide the desired concentration of monoethanolamine of from about 15 to about 20 weight percent. The added monoethanolamine, if any, can be introduced (by means not shown) into the returning regenerated aqueous monoethanolamine solution at any point in the system between the absorption zone 14 and the regeneration zone 24.

In the practice of the present invention, it has been found that, in addition to the temperature of the regenerated aqueous monoethanolamine solution being critical, the concentration of this aqueous solution within absorption zone 14 also is critical. For example, it has been found that, at the low temperatures employed in the present invention, a decrease begins to occur in the percentage change in the rate of absorption of carbon dioxide if the concentration of the aqueous monoethanolamine solution exceeds about 20 weight percent. This discovery was unexpected in light of the teachings and suggestions set forth in U.S. Pat. No. Re. 18,985. Therein, it is expressly disclosed that the use of a higher viscosity alkanolamine, e.g., triethanolamine, is preferred since such higher viscosity is conducive to a higher rate of absorption of the acidic gases. Implicit in this disclosure is the further suggestion that the use of more highly concentrated solutions of lower viscosity alkanolamines, e.g., monoethanolamine, also should be more conducive to higher rates of absorption. However, as shown by the data presented hereinbelow, while the actual rate of absorption can increase with increasing solution concentration the percentage change in the rate of absorption of carbon dioxide by an aqueous monoethanolamine solution decreases significantly as the concentration of the solution is increased beyond about 20 weight percent.

The following examples demonstrating the present invention are offered for illustrative purposes only and are not intended to limit the scope of the invention. In these examples all parts or percentages are by weight unless otherwise indicated.

EXAMPLE

To a cylindrical gas saturation chamber fitted with fritted glass partition located in a lower portion thereof are added 25 ml of an aqueous monoethanolamine solution. The chamber and the aqueous monoethanolamine solution contained therein are equilibrated to a constant temperature in a constant temperature oil bath. After equilibration, carbon dioxide then is continuously introduced into the chamber by way of an inlet located below the fritted glas partition. Nonabsorbed carbon dioxide is removed through an outlet located in an upper portion of the chamber. The carbon dioxide is introduced into the chamber for a period of one hour.

At the end of this time, the chamber containing the aqueous monoethanolamine solution is cooled to ambient temperature and the aqueous monoethanolamine solution recovered therefrom and analyzed for carbon dioxide content.

The results of a series of experiments carried out as described above using aqueous monoethanolamine solutions of various concentrations and at various temperatures are set forth in the Tables I and II below. Table III contains viscosity data relating to the aqueous monoethanolamine solutions at the various temperatures employed.

TABLE I

| Series No. | Temp. °C. | Rate Of $CO_2$ Absorption (g/min) at MEA Solution Concentrations (Wt. %) of | | | |
|---|---|---|---|---|---|
| | | 15 | 20 | 25 | 30 |
| A | 49 | 2.65 | 3.47 | 3.88 | 4.01 |
| B | 39 | 2.69 | 3.54 | 3.90 | 4.05 |
| C | 35 | 2.84 | 3.81 | 4.11 | 4.21 |

TABLE II

| Series No. | Temp. °C. | % Change in $CO_2$ Absorption Rate Between Successive 5 Wt. % Increment Changes in MEA Concentration | | |
|---|---|---|---|---|
| | | 15-20 | 20-25 | 25-30 |
| A | 49 | 30.9 | 11.8 | 3.3 |
| B | 39 | 31.6 | 10.2 | 3.8 |
| C | 35 | 34.0 | 7.9 | 2.4 |

TABLE III

| Series No. | Temp. °C. | Viscosities (Cp)[a] of MEA Solutions at Concentrations (Wt. %) of | | | |
|---|---|---|---|---|---|
| | | 15 | 20 | 25 | 30 |
| A | 49 | 0.94 | 1.08 | 1.22 | 1.42 |
| B | 39 | 1.14 | 1.22 | 1.54 | 1.79 |
| C | 35 | 1.22 | 1.42 | 1.66 | 1.99 |

[a]Cp - centipoise: determined employing a Brookfield Viscometer Model DV-2 fitted with an Ultralow Adaptor and operated at 60 r.p.m.

From the data presented in Tables II and III it readily is apparent that the percentage change in the rate of carbon dioxide absorption decreases dramatically with increasing solution concentrations (and increasing solution viscosities), specifically beyond solution concentrations of about 20 weight percent.

While the process constituting the present invention has been described in terms of what is believed to be the preferred embodiments, it is understood that changes and modifications can be made thereto without departing from the spirit and scope thereof.

I claim:

1. In a continuous process for recovering carbon dioxide from a carbon dioxide-rich gas stream wherein the gas stream is contacted with an aqueous alknolamine solution in an absorption section contained in an absorption zone to produce a carbon dioxide-lean gaseous overhead stream and a carbon dioxide-rich liquid effluent stream, wherein the carbon dioxide-rich liquid effluent stream is heated in a regeneration zone to produce a carbon dioxide-rich gaseous overhead stream and a carbon dioxide-lean liquid effluent stream said carbon dioxide-lean liquid effluent stream comprising a regenerated aqueous alkanolamine solution and wherein the regenerated aqueous alkanolamine solution is returned to and introduced into the absorption zone, the improvements which comprise:

cooling the regenerated aqueous alkanolamine solution to a temperature sufficient to maintain said solution at a temperature of up to about 35° C. throughout at least about 50 percent by volume of the absorption section contained in said absorption zone, said regenerated aqueous alkanolamine solution-containing an alkamolamine concentration ranging up to about 20 percent by weight; and introducing the cooled regenerated aqueous alkanolamine solution into the absorption zone to contact said carbon dioxide-rich gas stream within the absorption section and to remove carbon dioxide therefrom.

2. The improvement of claim 1 wherein the regenerated aqueous alkanolamine solution is cooled to a temperature ranging from about 26° C. to about 35° C.

3. The improvement of claim 1 wherein the alkanolamine in said regenerated aqueous alkanolamine solution is monoethanolamine.

4. The improvement of claim 1 wherein the alkanolamine concentration of said regenerated aqueous alkanolamine solution ranges from about 15 to about 20 weight percent.

* * * * *

UNITED STATES PATENT AND TRADEMARK OFFICE
CERTIFICATE OF CORRECTION

PATENT NO. : 4,869,884
DATED : September 26, 1989
INVENTOR(S) : Olen L. Riggs, Jr.

It is certified that error appears in the above–identified patent and that said Letters Patent is hereby corrected as shown below:

Col. 1, line 25, "Pat. No. Re. 18,985" should read --Pat. No. Re. 18,958--.

Signed and Sealed this

Twenty-ninth Day of December, 1992

Attest:

DOUGLAS B. COMER

Attesting Officer   Acting Commissioner of Patents and Trademarks